(12) United States Patent
Koren

(10) Patent No.: US 6,956,944 B1
(45) Date of Patent: Oct. 18, 2005

(54) METHOD AND APPARATUS FOR COMPENSATING FOR AN ECHO SIGNAL COMPONENT IN TELECOMMUNICATION SYSTEMS

(75) Inventor: Victor Koren, Rishon le Zion (IL)

(73) Assignee: Orckit Communications, Ltd., Tel-Aviv (IL)

( * ) Notice: Subject to any disclaimer, the term of this patent is extended or adjusted under 35 U.S.C. 154(b) by 0 days.

(21) Appl. No.: 09/460,891

(22) Filed: Dec. 14, 1999

(51) Int. Cl.[7] .................................... H04M 9/08
(52) U.S. Cl. ..................... 379/406.01; 379/402
(58) Field of Search ............... 379/406.01–406.16, 379/398, 399.01, 402, 405, 390.04, 391, 379/392

(56) References Cited

U.S. PATENT DOCUMENTS

| | | | | |
|---|---|---|---|---|
| 4,581,492 | A | * 4/1986 | Virdee .................... | 370/286 |
| 5,479,504 | A | * 12/1995 | Nakano et al. ........... | 379/402 |
| 6,327,309 | B1 | * 12/2001 | Dreyer et al. ............ | 375/258 |
| 6,445,791 | B1 | * 9/2002 | Grisamore et al. ....... | 379/402 |
| 6,542,604 | B1 | * 4/2003 | Blon et al. .............. | 379/398 |

FOREIGN PATENT DOCUMENTS

| | | | |
|---|---|---|---|
| EP | 0 693 846 | 1/1996 | .......... H04M 3/00 |
| WO | WO 00/13335 | 3/2000 | ........... H04B 3/23 |

OTHER PUBLICATIONS

"Patent Abstracts of Japan", vol. 005, No. 063 (e-054), Apr. 28, 1981.
"Patent Abstracts of Japan", vol. 013, No. 463 (e-833), Oct. 19, 1989.

* cited by examiner

Primary Examiner—Xu Mei
Assistant Examiner—Con P. Tran
(74) Attorney, Agent, or Firm—Darby & Darby

(57) ABSTRACT

A balanced hybrid circuit for compensating for transmission echo signal in a modem. The hybrid circuit includes transmission echo compensation circuits that approximate the echo signal effects of the line and line transformer, respectively, and produce a transmission echo signal replica. A sample of the transmission signal and the replica of the transmission echo are then subtracted from the signal received on the line to produce a received signal isolated from the transmission signal and the transmission echo signal.

3 Claims, 4 Drawing Sheets

METHOD AND APPARATUS FOR COMPENSATING FOR AN ECHO SIGNAL COMPONENT IN TELECOMMUNICATION SYSTEMS

FIELD OF THE INVENTION

The present invention relates generally to the field of data communications and in particular to a circuit and method for compensating for transmission echo in a telecommunications system.

BACKGROUND OF THE INVENTION

Data communication systems are commonly used to transmit and/or receive data between remote transmitting and receiving locations. A central facet of any data communications system is the reliability and integrity of the data communicated. Ideally, the data, received at the receiving location is identical to the data transmitted from the transmitting location. Practically however, the effects of transmission echo (i.e., reflection of the transmitted signal such that it appears as part of the received signal) can cause the data which is being received to be corrupted or lost.

Signals received by a modem typically have a large dynamic range and may be affected by transmission echo. As modems transmit higher bandwidth signals over traditional twisted pair copper telephone lines, echo has a greater effect on modem performance. For example, a broadband Digital Subscriber Line (xDSL) operating over twisted pair copper wires, such as Asymmetric Digital Subscriber Line (ADSL) technology, uses signals transmitted at up to and over two megahertz which are typically attenuated by as much as 90 dB before being received by the modem. Additionally, the upstream and downstream data channels may use overlapping frequencies. When overlapping frequencies are used, the modem transmission echo must be compensated for, as it will have a greater amplitude than the received signal in the same frequency spectrum. In ADSL systems, the frequency spectrum is assigned to the various communications channels conveyed over the twisted pair using a splitter. The lowest 4 kHz of bandwidth is reserved for use by analog devices such as common telephones of the baseband Plain Old Telephone Service (POTS). A medium frequency range full duplex channel in the frequency range of 30 kHz to 140 kHz may be defined to carry upstream ADSL data and downstream ADSL data having a typical data rate in the 16 kbps to 640 kbps range. A high frequency channel that uses frequencies in the 140 kHz to 1104 kHz range carries downstream data having a typical data rate in the 1.536 Mbps to 6.144 Mbps range. Accordingly, the medium frequency upstream and downstream data channels used by ADSL modems may use overlapping frequency ranges.

Modems and other communication systems typically include a hybrid coupling circuit for connecting to the local loop which then connects to the telephone company central office. Additionally, the transmitted and received signals may be transmitted on overlapping frequencies as in the case of ADSL. Accordingly, an ADSL modem must incorporate a suitable hybrid circuit to attenuate or compensate for its own transmission echo in order to maximize the dynamic range of the receive path of the ADSL modem. The received signal is detected at the secondary side (the side of the transformer connected to the modem and hybrid circuit) of the line transformer. The transmitted echo signal (which has had its characteristics affected by the line transformer and the line itself) is inseparable from the received signal at the secondary side of the line transformer. In ADSL applications, it is likely that the local loop will be sufficiently long such that the effect of the telephone company central office devices or other devices connected to the ADSL modem will be negligible. However, the transmitted echo signal may oftentimes be affected by the telephone company central office devices, requiring compensation by the line compensation circuit of the balanced hybrid circuit.

Simultaneously with the detection of the received signal, a sample of the transmitted signal is taken from the output of the modem line driver and this sample is processed in order to obtain a replica of the transmitted echo signal. The replica of the transmitted echo signal is then subtracted from the received signal. Accordingly, the effectiveness of the attenuation of the transmission echo signal is related to how well the reconstructed echo signal matches the actual transmission echo signal. Accordingly, the received signal has an improved received to transmit echo signal ratio when the echo compensation circuit of the hybrid circuit closely replicates the transmission echo.

Prior art hybrids and circuits used to compensate for transmission echo signals in modems have several disadvantages, such as the use of a large number of components. Additional disadvantages of prior art devices include the use of active circuitry for transmission echo reconstruction and subtraction that can increase distortion and nonlinearity.

SUMMARY OF THE INVENTION

The invention relates to a balanced hybrid coupling circuit and method of using the hybrid in a full duplex modem device to attenuate the transmission echo of the modem when receiving a signal from another communications device over a communications channel such as common telephone lines.

In general, the balanced hybrid coupling circuit of the present invention receives a differential transmission signal from a pair of differential drivers in the modem. A line transformer couples the differential transmit signal to the local loop twisted pair copper cable. The received signal from the far end is received on the same local loop twisted pair copper cable and is also coupled to the modem receiver by the line transformer.

Because the transmit and receive signals operate on overlapping frequencies, the transmit signal is sampled, e.g., across a sampling resistor, and subtracted from the line signal to reconstruct the received signal. Because the modem transmission will create an echo signal due to the effects of the line transformer and local loop, the present invention will simultaneously sample the transmitted signal across two RC networks that respectively simulate the effects of the line transformer and the local loop. These RC networks produce components of a transmission echo signal replica that are also subtracted from the line signal to more accurately isolate the received signal which is then supplied to the differential receiver in the modem.

The first RC network of each half of the balanced hybrid circuit is used to compensate for the transmission echo effect of the line transformer by simulating the transmission echo effect of the line transformer and producing a component of a transmission echo replica signal that approximates the transmission echo produced by the line transformer. The sample is effectively inverted by actually sampling the transmission signal of the opposite transmitter of the differential transmitter pair. The transmission echo replica signal component is subtracted from the line signal to isolate the received signal.

The second RC network of each half of the balanced hybrid circuit is used to compensate for the transmission echo effect of the line or local loop twisted pair copper wire by simulating the transmission echo effect of the line and producing a component of a transmission echo replica signal that approximates the transmission echo produced by the line. The transmission echo replica signal component is subtracted from the line signal to further isolate the received signal.

Additionally, in a further embodiment where the effect of the telephone company central office devices or other devices connected to the ADSL modem is not negligible, that effect can be compensated for by modifying the balanced hybrid circuit.

BRIEF DESCRIPTION OF THE DRAWINGS

A preferred embodiment of the present invention is described herein with reference to the drawings wherein.

DETAILED DESCRIPTION OF THE PREFERRED EMBODIMENT

In general, the balanced hybrid coupling circuit of the present invention transmits and receives a differential signal through a line transformer. The echo compensation hybrid circuit creates a replica of the transmission echo signal and subtracts the echo replica signal along with the transmitted signal from the line to obtain the true received signal.

A preferred embodiment of the present invention is described in detail below with reference to the figures. The figures will be used to explain the theory of operation of the hybrid circuit using several simplifications of the circuit of the preferred embodiment shown in FIG. 8.

Figure 1:
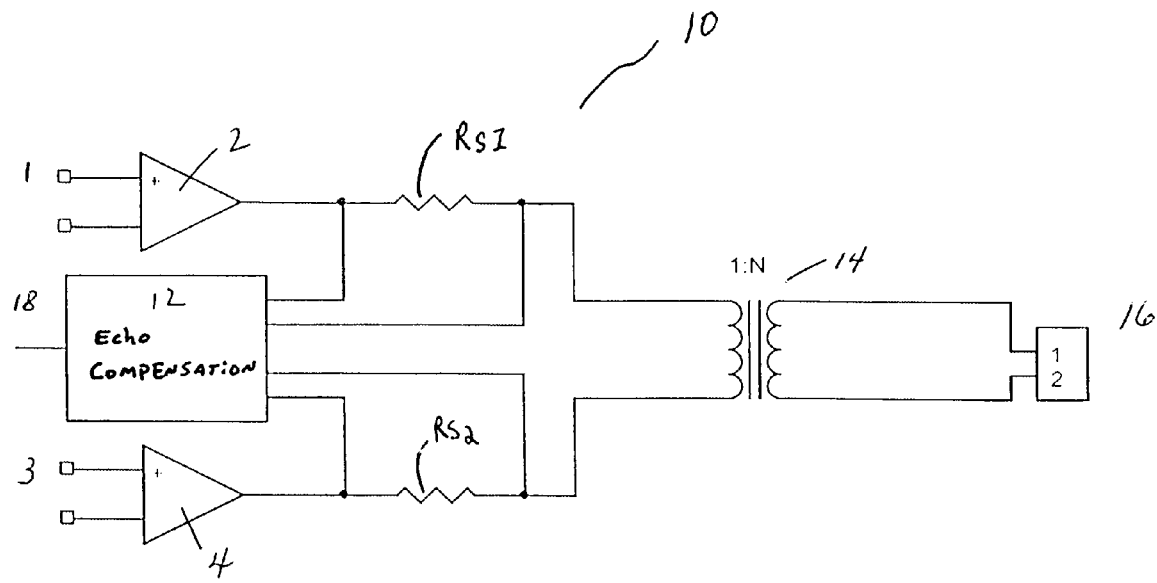
FIG. 1 is a schematic diagram of a preferred balanced hybrid circuit.

Referring to FIG. 1, therein is illustrated an overview of the balanced hybrid echo compensation circuit 10. The differential transmission signals 1, 3 are received at the two respective line drivers 2, 4. The transmission signals are sampled by the respective sampling resistors Rs1, Rs2 at the output of the line drivers 2, 4 and coupled to the line 16 by line transformer 14. The sampled transmission signal is input to the echo compensation circuit 12 which produces a compensated received signal 18.

Figure 2:
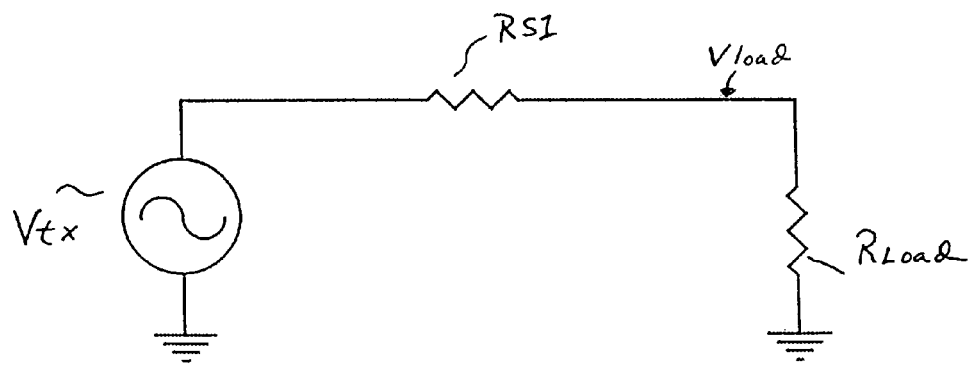
FIG. 2 is a schematic diagram of a single ended (unbalanced) simplification of the transmit circuit shown in FIG. 1 assuming an ideal transformer and a constant Ohmic line impedance.

Referring to FIG. 2, therein is illustrated a single ended (unbalanced) simplification of the transmit portion of the hybrid circuit shown in FIG. 1 assuming an ideal transformer 14 and a constant Ohmic impedance for line 16. An ideal transformer transforms impedance from its primary winding (line side) to its secondary winding (hybrid side) according to its turns ratio and has an infinite parallel inductance. Accordingly, the transmit portion of the simplified hybrid circuit includes a transmitted signal source Vtx in series with a sampling resistor Rs1 and a load resistor Rload which equals the resistance of the line 16 transformed to the secondary winding of the transformer. The voltage at the load resistor, at node Vload, is determined by the equation:

$$Vload = Vtx \, (Rload/(Rs1+Rload)). \qquad \text{(Eq. 1)}.$$

The parameter "return loss" is a measure of how close the modem output impedance matches a reference impedance, which is defined as 100 Ohms in the standard specification for an ADSL modem. High return loss is an advantageous characteristic of a modem, indicating a proper impedance match. In order to achieve a high return loss value, the sample resistor Rs1 is chosen to equal the load resistance value Rload.

Figure 3:
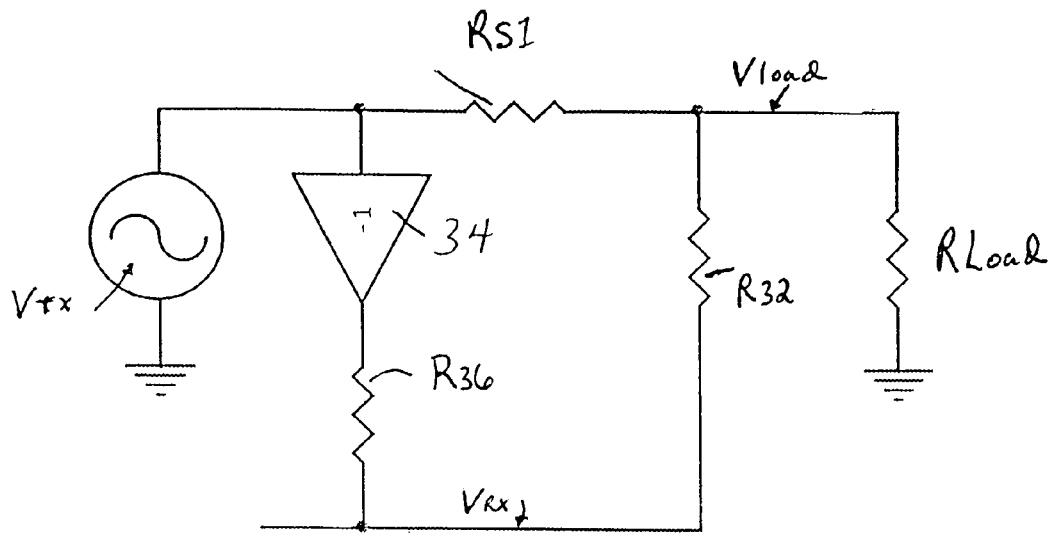
FIG. 3 is a schematic diagram of a single ended (unbalanced) simplification of the hybrid circuit shown in FIG. 1 assuming an ideal transformer and a constant Ohmic line impedance.
Figure 8:
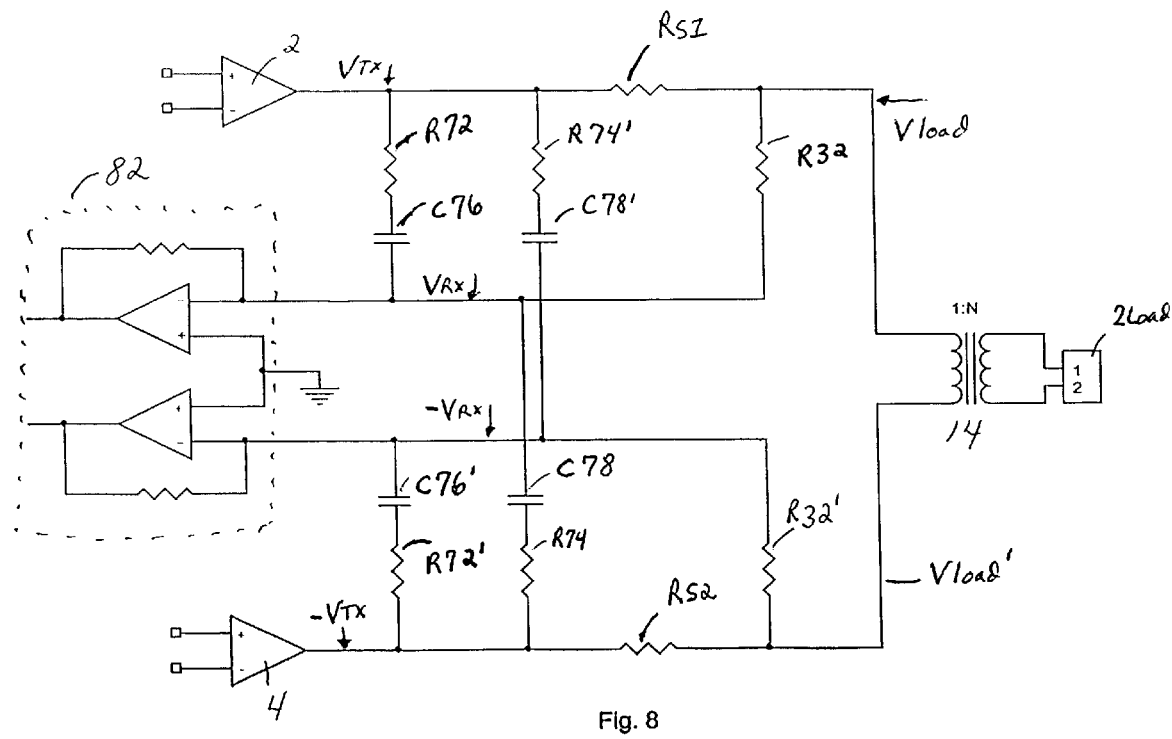
FIG. 8 is a schematic diagram of a balanced hybrid circuit.

Referring to FIG. 3, therein is illustrated a single ended (unbalanced) simplification of the hybrid circuit shown in FIG. 1 that is used to describe the echo compensation for the real component of the load reflected through the transformer 14. FIG. 3 illustrates a simplification assuming an ideal transformer 14 and a constant Ohmic impedance for line 16. As discussed below, the line 16 is assumed to have a very large attenuation that masks the influence of the impedance of any modem or other communications device connected to the other end of the line 16. A current limiting resistor R32 is placed between the Vload node and the Vrx node. The resistor R32 has a value chosen to be much greater than the value of Rs1 so that it does not significantly load the Vload node. As described herein, a sampling signal can be taken from the complementary signal node of the balanced circuit as shown in FIG. 8 where node -Vrx is connected to C78'. Accordingly, inverter 34 is used in the simplified circuit of FIG. 3 to denote the configuration in the balanced circuit where the sample signal is taken from the complementary signal of the balanced circuit. Accordingly, as Rs1 approaches the value of Rload, the value of Vload approaches the value Vtx /2. Because Rs1 is preferably equal to Rload, equation 1 can be simplified to:

$$Vload = Vtx/2 \qquad \text{(Eq. 2)}.$$

Summing the sample of Vload through current limiting resistor R32, and the sample of -Vtx via inverter 34 through resistor R36 (which is preferably substantially equal to 2*R32) will result in a voltage null at the Vrx node.

For example, if the current flowing through R32 is designated I32 and the current through R36 is designated I36, we have the following equation assuming that the transmission echo at Vrx is zero:

$$I32 = (Vtx*((Rload\|R32)/(Rs1+Rload\|R32)))*1/R32 \qquad \text{(Eq. 3)}.$$

And after algebraic manipulation, the equation is restated as follows:

$$I32 = Vtx*(Rload)/(Rs1*R32+Rload*(Rs1+R32)) \qquad \text{(Eq. 4)}.$$

The other current path into node Vrx is through R36 described as follows:

$$I36 = Vtx*1/R36 \qquad \text{(Eq. 5)}.$$

Therefore, in order to null the transmission signal at node Vrx, and accounting for the inverter 34, $$I32=I36 \quad \text{(Eq. 6).}$$

And after algebraic manipulation, we have:

$$R36=Rs1*R32/Rload+Rs1+R32 \quad \text{(Eq. 7).}$$

As discussed below, a desirable deign goal is impedance matching whereby Rs1 is equal to Rload. If R32 is chosen to be much greater than Rs1 (R32>>Rs1) in order to minimize loading of the circuit by R32, a design rule for the balanced hybrid echo compensation circuit is developed as:

$$R36=2*R32. \quad \text{(Eq. 8).}$$

As described below, the resistor R36 of the simplified circuit corresponds to resistor R74 in the final balanced hybrid compensation circuit of FIG. 8 as part of the RC network which compensates for the echo effect of the transformer 14.

Figure 4:
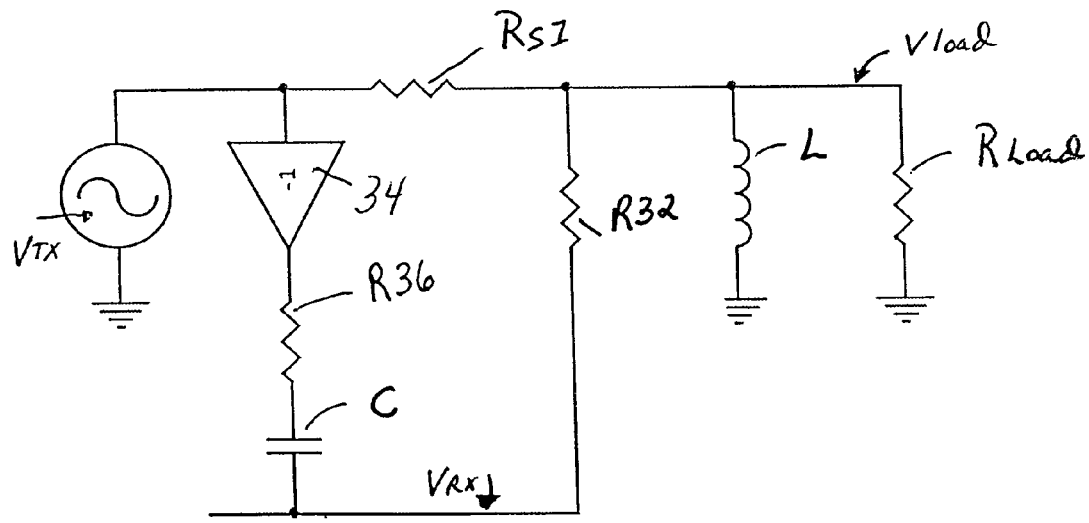
FIG. 4 is a schematic diagram of a single ended (unbalanced) simplification of the transmit portion of the hybrid circuit shown in FIG. 1 assuming a real transformer with secondary inductance and a constant Ohmic line impedance.

Referring to FIG. 4, therein is illustrated a single ended (unbalanced) simplification of the hybrid circuit shown in FIG. 1 that is used to describe the echo compensation for the effect of the secondary winding of a real transformer. FIG. 4 illustrates a simplification assuming that the transformer 14 is not an ideal transformer, but rather a non-ideal transformer 14 with a secondary inductance L and a constant Ohmic impedance Rload for line 16. The inductance L of the transformer is simplified as an inductance connected in parallel with Rload. Accordingly, to compensate for the effect of the line transformer 14 secondary inductance L, the sample of Vtx that is subtracted from Vrx is modified by capacitor C. The inductor L affects Vload by adding a zero at the origin and a pole at the frequency that corresponds to the RL time constant of L and the parallel combination of Rs1 and Rload. In the final balanced circuit, the sample is taken from the complementary transmission signal. Accordingly the compensating sample should have a signal with the same amplitude, but with opposite polarity. As described below, the capacitor C of the simplified circuit corresponds to capacitor C78 in the final balanced hybrid compensation circuit of FIG. 8 as part of the RC network which compensates for the echo effect of the transformer 14.

Figure 5:
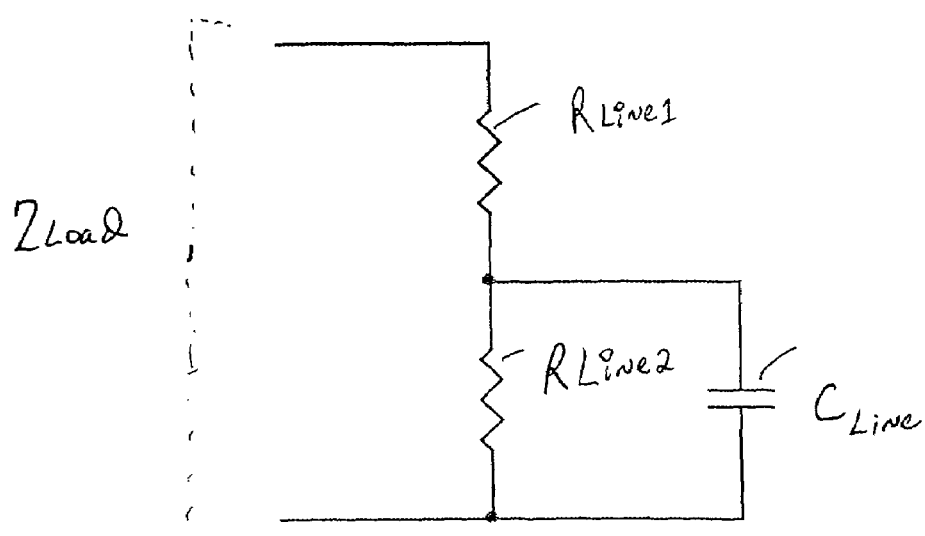
FIG. 5 is a schematic diagram of the input impedance of the twisted pair local loop.

Referring to FIG. 5, therein is illustrated a simplification of the input impedance of the twisted pair local loop line 16. An actual twisted pair line has a characteristic impedance that is complex and is a function of the frequency of the transmitted and received signals. The simple model of such an impedance is shown in FIG. 5, and includes Rline1 in series with the parallel combination of Rline2 and Cline. The characteristic impedance of the local loop twisted pair copper wire varies according to the physical parameters such as the distance from the telephone company central office, wire gauge and number of twists per inch. Accordingly, there are differences in line impedance in different countries and as between different lines in a country. A regulatory agency of a country may specify a line impedance value required of the telephone company and in such instance the value of a typical line impedance is known a priori. Additionally, the line 16 is assumed to have attenuation that masks the influence of the impedance of the equipment at the other end of the line 16. If a communications device attached to the other end of line 16 has an impedance influence that is not negligible, the impedance of the line 16 can be modeled to consider such communications device impedance.

Figure 6:
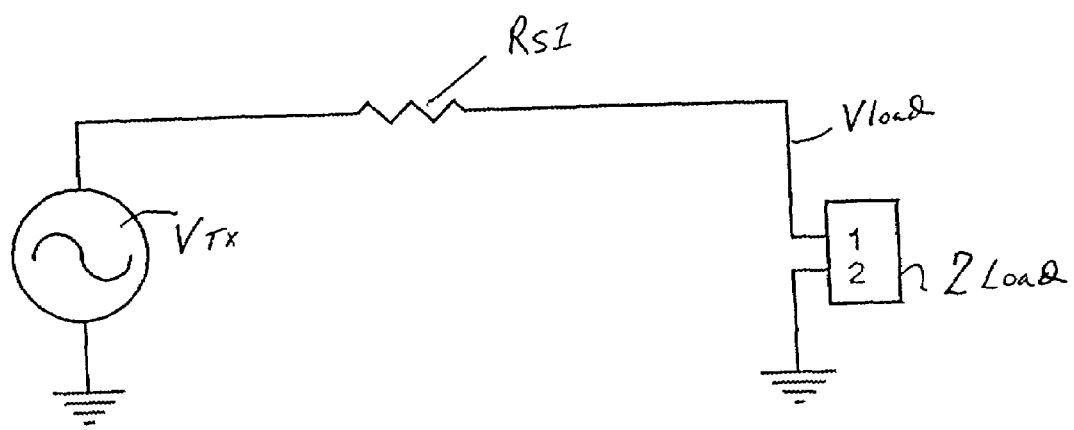
FIG. 6 is a schematic diagram of a single ended (unbalanced) simplification of the transmit portion of the hybrid circuit shown in FIG. 1.

Referring to FIG. 6, therein is illustrated a single ended (unbalanced) simplification of the transmit circuit shown in FIG. 1, similar to the simplification shown in FIG. 2, but instead having a complex load impedance Zload. As can be seen from FIG. 5, the magnitude of the load impedance decreases as the frequency increases. Therefore, to compensate for the effect of the line impedance on the transmission signal Vtx, the Vtx sample will be processed to provide an echo replica signal that compensates for the frequency dependance of the line impedance. The replica signal will be created using a second RC network as described below.

Figure 7:
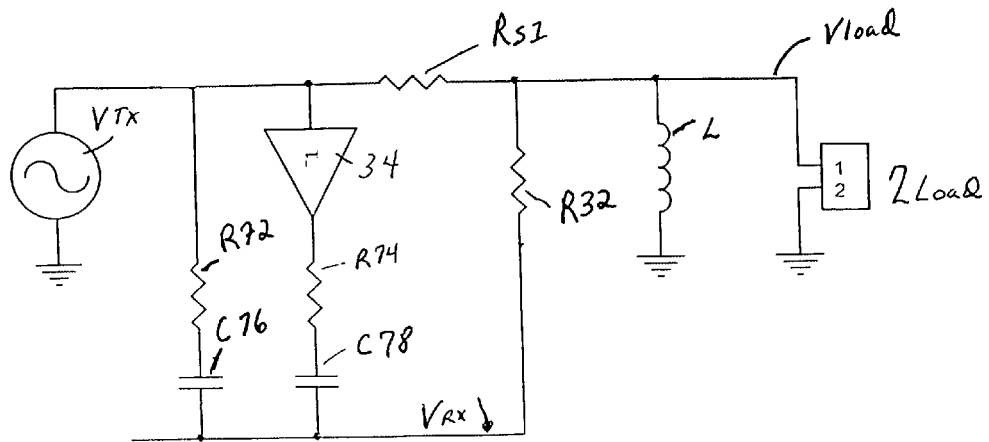
FIG. 7 is a schematic diagram of a single ended (unbalanced) hybrid circuit.

Referring to FIG. 7, therein is illustrated a single ended (unbalanced) hybrid circuit having two RC branches which compensate for the transmission echo effect of the line impedance and line transformer, respectively. The first RC network of each half of the balanced hybrid circuit is used to compensate for the transmission echo effect of the line transformer and includes resistor R74 in series with capacitor C78 as described above with reference to FIGS. 2–4. The second RC network of each half of the balanced hybrid circuit is used to compensate for the transmission echo effect of the line or local loop twisted pair copper wire and includes resistor R72 in series with capacitor C76 as described above with reference to FIGS. 5 and 6.

Referring to FIG. 8, therein is illustrated a complete schematic diagram of the balanced hybrid echo compensation circuit. The inverter 34 that is used in FIG. 7 to denote a connection to the complementary circuit is not used in FIG. 8 because the actual connection between node Vrx and C78 and the connection between node -Vrx and C78' are shown. The balanced hybrid coupling circuit receives a differential transmission signal from a pair of differential drivers 2,4. The line transformer 14 couples the differential transmission signal output by the line drivers 2,4 through sampling resistors Rs1, and Rs2 and then to the local loop twisted pair copper cable line 16. The hybrid receives a signal that is transmitted on the same local loop twisted pair copper cable line 16 and is also coupled to the modem receiver by the line transformer 14. The following description relates to one half of the balanced hybrid, but as can be appreciated, the other half of the circuit denoted with prime values in FIG. 8 operates in an identical manner.

Because the transmit and receive signals operate on overlapping frequencies, the transmit signal itself must first be subtracted. This is achieved by sampling the transmit signal across a sampling resistor Rs1 through current limiting resistor R32. Resistor R32 has a much greater value than Rs1 in order to minimize any loading effect. The sampled transmit signal is subtracted from the line signal to create the received signal isolated from the transmission signal on the local loop. Because the modem transmission also creates an echo signal due to the effects of the line transformer 14 and local loop line 16, the hybrid circuit simultaneously samples the transmitted signal Vtx across two RC networks R72, C76 and R74, C78 which respectively simulate the effect of the line transformer and the local loop. These RC networks produce components of a transmission echo signal replica that are also subtracted from the line signal to further isolate the received signal Vrx which is then supplied to the differential receiver 82 in the modem.

The first RC network, the line transformer compensation circuit, R74, C78 having resistor R74 and capacitor C78, is used to compensate for the transmission echo effect of the line transformer, by simulating the transmission echo effect of the line transformer and producing a component of a transmission echo replica signal that approximates the transmission echo produced by the line transformer 14. The sample is effectively inverted by actually sampling the transmission signal -Vtx of the opposite transmitter of the differential transmitter pair. The transmission echo replica signal component is subtracted from the line signal to isolate the received signal Vrx.

The second RC network, the line compensation circuit, R72, C76 having resistor R72 and capacitor C76, is used to compensate for the transmission echo effect of the line (or local loop twisted pair copper wire and any non-negligible communication device effect) 16, by simulating the transmission echo effect of the line 16 and producing a component of a transmission echo replica signal that approximates the transmission echo produced by the line. The transmission echo replica signal component is subtracted from the line signal to further isolate the received signal Vrx.

Additionally, if the effect of the telephone company central office devices or other devices connected to the ADSL modem is not negligible, that effect can be compensated for by modifying the balanced hybrid circuit. The effect of any other device connected to the line can be compensated by including their electrical models at the final stage of the balanced hybrid circuit design when the balanced hybrid circuit components are optimized. A typical line impedance table is shown below. The line impedance table could be modified to include the electrical characteristic of any other device connected to the line.

TABLE 1

| Frequency (MHz) | Z (Ohm) | Phase (Deg.) |
|---|---|---|
| .005 | 301.2 | −280.8 |
| .01 | 220.6 | −191.8 |
| .015 | 186.5 | −151.5 |
| .02 | 167 | −126.8 |
| .025 | 154.5 | −109.9 |
| .03 | 145.7 | −97.4 |
| .035 | 139.2 | −87.5 |
| .04 | 134.3 | −79.6 |
| .05 | 127.3 | −67.5 |
| .06 | 122.5 | −58.7 |
| .07 | 119.2 | −52 |
| .08 | 116.8 | −46.8 |
| .09 | 115 | −42.6 |
| .1 | 113.6 | −39.1 |
| .12 | 111.5 | −33.8 |
| .14 | 110.1 | −29.9 |
| .16 | 109.2 | −26.9 |
| .18 | 108.4 | −24.6 |
| .2 | 107.8 | −22.8 |
| .25 | 106.7 | −19.5 |
| .3 | 105.9 | −17.3 |
| .4 | 104.8 | −14.6 |
| .5 | 103.9 | −12.9 |
| .6 | 103.1 | −11.7 |
| .7 | 102.5 | −10.9 |
| .8 | 101.9 | −10.2 |
| 1.0 | 100.9 | −9.1 |

The component values of the balanced hybrid circuit can then be optimized to provide optimal echo compensation using commercially available circuit optimization software such as the "Super Star" package available from Eagleware Corporation.

Several design rules are described which are preferably utilized to optimize the effectiveness of the above described balanced hybrid echo cancellation circuit. The value of R32 should be much larger than Rs1 for minimal loading of the transmitted signal.

The transformer inductance L is chosen according to the lowest working frequency to minimize its attenuation at the lowest working frequency and to obtain adequate frequency matching at the lowest frequency used in order to achieve a high return loss as usually required by relevant industry and government standards.

The resistor R74 is selected such that the resistance value is lower than the value of R72 because the current through resistor R74 is the main hybrid signal injection route. The signal current injected through resistor R72 has a lower value than that through R74 so that it lowers the total signal current injected into node Vrx by injecting a smaller current with reverse polarity. Accordingly, R72 has a higher resistance value than R74.

Furthermore, the critical frequency of the transformer compensation RC network, R74, C78 is selected such that it is lower than the critical frequency of the line compensation RC network, R72, C76 such that the former influences the hybrid operation at the transformer cutoff frequency at the lowest working frequency. The line compensation RC network, R72, C76 affects the signal injection at a higher frequency where it compensates for the impedance change of the line with varying frequency.

Additionally, the value of resistor R74, is selected such that it is twice the resistance of R32 so that the voltage at node Vtx is approximately twice the voltage as at Vload. Accordingly, to achieve adequate rejection of the transmission signal Vtx at node Vrx, R74 should be approximately twice as large as R32 as described above in relation to the analysis of the circuit simplification shown in FIG. 3.

According to the preferred embodiment of the present invention, there are two current paths into the received signal node Vrx. The first current path includes the first RC network R74, C78 which compensates for the transmission echo effect of the line transformer. The second current path includes the second RC network R72, C76 which compensates for the transmission echo effect of the local loop and can at all frequencies used be made to inject a current of the same magnitude with opposite polarity into the received signal node Vrx, thereby achieving a high transmission signal and transmission echo signal rejection from the received signal path.

The echo signal current into node Vrx is canceled as described below. There are two complementary methods of describing the echo signal. First, we could analyze the circuit using a nominal reference load impedance with an echo signal injected at the output port, the echo signal having a phase and amplitude derived from the parameters of the real life line. Secondly, we could analyze the circuit using a load having a frequency varying impedance. Therefore, when using the varying impedance load view, it is no longer necessary to consider an echo signal that is injected from the line into the balanced hybrid coupling circuit.

Because the hybrid branches are connected at low impedance points, there is no interdependency between the two complementary halves of the balanced hybrid coupling circuit since the hybrid branch from one half of the circuit connected to the other half of the circuit does not load the node where it is connected.

Additionally, the received signal is a signal that is injected from the line 16 to the input of the balanced hybrid coupling circuit at node Vload and injects signal current into node Vrx through resistor R32. The other hybrid branches do not inject any received signal current into node Vrx because the other hybrid branches are connected at the output of the Transmission signal line driver 2 that has an output impedance of zero. Accordingly, only the transmission signal Vtx exists at the output of the Transmission signal line driver 2 and there is no received signal cancellation through the other hybrid branches.

The balanced hybrid coupling circuit of the present invention advantageously utilizes a circuit topology with a relatively small number of components. The present invention may utilize passive components in the transmission echo reconstruction circuit in order to maximize linearity of the signals processed and minimize distortion. The present invention may also utilize passive components in the subtraction circuit. Accordingly, only the subtracted signal with the enhanced receive to transmit signal ratio enters the receive path amplifiers, thus minimizing distortion and maximizing the dynamic range of the receiver.

The present invention provides compensation for the transmission echo signal component produced by the line transformer. The present invention may also compensate for a high pass filter incorporated into the line transformer or connected to the line transformer by modeling the impedance of that filter as part of the load impedance. A simple RC network of the balanced hybrid circuit provides sufficiently effective echo compensation only when there is relatively slow variation of the line impedance and phase. High pass filters have a higher rate of change of impedance and phase as the order of the filter increases. A third order high pass filter can be compensated from frequencies slightly above the critical frequency and above. As the order of the filter is increased, the frequency ranges compensated for will be much higher than the critical frequency and it will be a less effective hybrid circuit. In contrast, the present invention may compensate for the transmission echo effect of up to a third order line high pass filter which can include series capacitors at the primary (line side) and secondary (modem and hybrid side) of the transformer.

Additionally, the present invention may utilize the connection of two series RC branches that are connected between low impedance points, which cancels the interaction between the branches such that a change to one branch will not affect the other branch.

The system and method of the present invention are implemented in any number of communications or other related schemes where full duplex transmission over overlapping frequencies require the compensation for transmission echo signals, e.g., in embedded telecommunications systems, modems, and other wire-line and non-wireline signal transfer applications. The system may be implemented in embedded applications or as part of a larger data communications system.

While the invention has been described with reference to xDSL and ADSL modems connected to standard twisted pair copper telephone network, the invention is of course useful in other communications systems which require compensation for transmitted signal echo.

Although the preferred embodiments have been disclosed for illustrative purposes, those skilled in the art will appreciate that many additions, modifications and substitutions are possible without departing from the scope and spirit of the invention as defined by the accompanying claims.

What is claimed is:

1. An apparatus for compensating for echo signal in a telecommunications device comprising:
   a first differential transmitter having an output terminal coupled to a first transmitted signal node;
   a second differential transmitter having an output terminal coupled to a second transmitted signal node;
   a first current limiting resistor having a first terminal coupled to the first transmitted signal node and a second terminal coupled to a first line transformer node;
   a second current limiting resistor having a first terminal coupled to the second transmitted signal node and a second terminal coupled to a second line transformer node;
   a first sampling resistor having a first terminal coupled to the first line transformer node and a second terminal connected to a first received signal node;
   a second sampling resistor having a first terminal coupled to the second line transformer node and a second terminal connected to a second received signal node;
   a first compensation circuit having a first terminal coupled to the first transmitted signal node and a second terminal coupled to the first received signal node;
   a second compensation circuit having a first terminal coupled to the first transmitted signal node and a second terminal coupled to the second received signal node;
   a third compensation circuit having a first terminal coupled to the second transmitted signal node and a second terminal coupled to the second received signal node; and
   a fourth compensation circuit having a first terminal coupled to the second transmitted signal node and a second terminal coupled to the first received signal node.

2. An apparatus for compensating for echo signal in a telecommunications device according to claim 1 wherein,
   the first compensation circuit further comprises a first compensation resistor and a first compensation capacitor connected in series;
   the second compensation circuit further comprises a second compensation resistor and a second compensation capacitor connected in series;
   the third compensation circuit further comprises a third compensation resistor and a third compensation capacitor connected in series; and
   the fourth compensation circuit further comprises a fourth compensation resistor and a fourth compensation capacitor connected in series.

3. An apparatus for compensating for echo signal in a telecommunications device according to claim 1 wherein,
   the first terminal of the first sampling resistor is coupled to the first transmitted signal node; and
   the first terminal of the second sampling resistor is coupled to the second transmitted signal node.

\* \* \* \* \*